United States Patent [19]

Galvefors, deceased

[11] Patent Number: 4,744,704
[45] Date of Patent: May 17, 1988

[54] DRILL

[75] Inventor: Nils L. Galvefors, deceased, late of Sandviken, Sweden, by Margareta Signe Gavlefors, legal representative

[73] Assignee: Santrade Limited, Lucerne, Switzerland

[21] Appl. No.: 8,156

[22] Filed: Jan. 22, 1987

Related U.S. Application Data

[63] Continuation of Ser. No. 753,055, Jul. 9, 1985, abandoned.

[30] Foreign Application Priority Data

Jul. 12, 1984 [SE] Sweden .............................. 8403685

[51] Int. Cl.⁴ .......................... B23B 51/02; B23C 5/18
[52] U.S. Cl. .................................... 408/144; 408/230; 408/713
[58] Field of Search ............... 408/144, 210, 223, 224, 408/227, 229, 230, 231, 232, 233, 239 R, 713; 76/108 R, 108 T; 175/409, 410

[56] References Cited

U.S. PATENT DOCUMENTS 2,237,901  4/1941  Chun ................................. 408/227
2,902,260  9/1959  Tilden ............................... 175/410
4,222,690  9/1980  Hosoi ................................. 408/230

FOREIGN PATENT DOCUMENTS 600276   7/1934  Fed. Rep. of Germany ...... 175/410
2523201  12/1976  Fed. Rep. of Germany ...... 408/233

Primary Examiner—Z. R. Bilinsky
Attorney, Agent, or Firm—Burns, Doane, Swecker & Mathis

[57] ABSTRACT

A drill comprising a drill body (11) and a drill tip (22). The drill tip is detachably secured in a slot in the drill body. The drill tip (22) consists of a tip body and cutting portions. The drill body (11) and the tip body comprise cooperating surfaces in order to receive the radial and axial forces acting on the cutting portions.

7 Claims, 2 Drawing Sheets

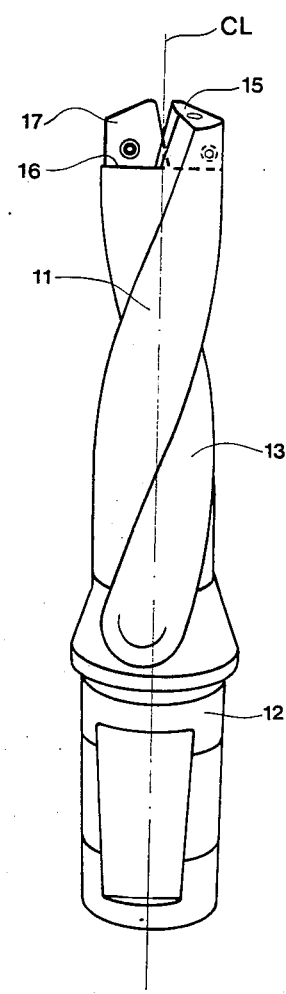
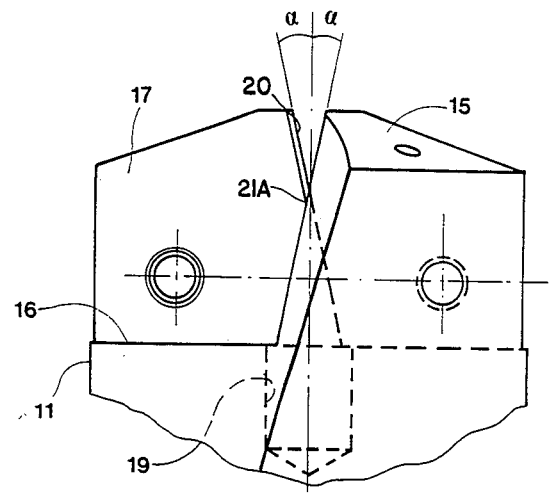
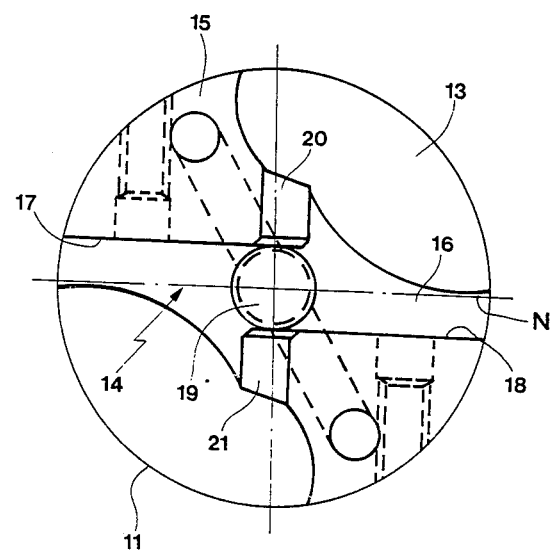

DRILL

This application is a continuation of application Ser. No. 06/753,055, filed July 9, 1985, abandoned.

BACKGROUND AND OBJECTS OF THE INVENTION

The present invention relates to a drill comprising a drill tip provided with cutting edges adapted to be secured to a drill body having screw-shaped or straight chip gullets. The drill tip is detachably secured in a diametrically extending slot in the front end of the drill. The drill tip comprises a tip body and at least one cutting insert secured thereto. The tip body and the drill body comprise cooperating contact surfaces to receive radial forces acting on the drill in the longitudinal direction and the transverse direction thereof. The contact surfaces which are provided to receive the forces directed in the longitudinal direction of the slot incline relative to the rotational axis of the drill.

Hitherto known drills which have cutting inserts brazed to the working end of the drill body have to undergo time-consuming operations when the drill has become dull. These operations consist in changing of the worn inserts to fresh ones and rebrazing or regrinding of the cutting edges of the cutting inserts. The drill body has a longer working life than the inserts and, therefore, it is expensive to have one drill body per cutting portion. The regrinding of the brazed inserts mean handling of also the somewhat bulky drill body.

The objects of the present invention are to overcome these drawbacks.

THE DRAWINGS

The invention will be more closely described hereinafter with reference to the appended drawings showing a preferred embodiment wherein further characterizing features and advantages will become apparent.

FIGS. 1-3 show a drill body in a plane view, a side view and a top view, respectively.

DETAILED DESCRIPTION OF PREFERRED EMBODIMENTS OF THE INVENTION

Figure 4:
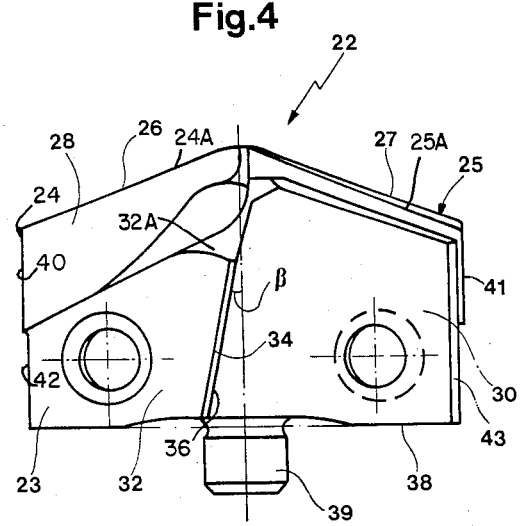
FIGS. 4-6 show a drill tip in a plane view, a side view and a top view, respectively.

FIGS. 1-3 show a drill body without cutting means, FIGS. 2 and 3 of which are enlarged portions of the drill body in FIG. 1. The drill body 11 has a mainly cylindrical basic shape. It comprises a shank 12 in one of its edges and two screw-shaped chip gullets 13 which mainly extend from the shank 12 to the other end of the drill body, in which a diametrical slot 14 is arranged. The chip gullets may alternatively be straight. The front surface of the drill body has the shape of two segments of a cone, each of which has a fluid passage. The slot 14 is bordered by a bottom 16 and two upstanding side walls 17, 18. The bottom 16 of the slot 14 is mainly perpendicular to the rotational axis CL of the drill and it is arranged to receive the axial forces during the drilling operation. The bottom 16 is provided with an axially extending hole 19 whose centerline coincides with the rotational axis CL. Alternatively the hole 19 may be replaced by an axially extending tap which projects from the bottom 16 of the slot. The periphery of the hole 19 or the tap is circular in this embodiment but it may alternatively be oval or polygonal. The side walls receive the radial forces that arise during the drilling operation and that are perpendicular to the axial plane N of the rotational axis CL. The side walls 17 and 18 are mainly perpendicular connected to support surfaces 20 and 21, respectively, which are arranged to receive radial forces whose directions are parallel with the axial plane N of the rotational axis CL. Each support surface 20, 21 inclines an angle α relative to the rotational axis CL. The angle α is between 5° to 15°, preferably 7° to 12°. The support surfaces 20, 21 incline such that they intersect each other at 21A as seen in a side view according to FIG. 2. The drill body is provided with a shoulder in order to facilitate the rotation of the drill. Each side wall 17, 18 has a threaded hole extending therethrough. The threaded holes are adapted to receive fastening screws.

Figure 5:
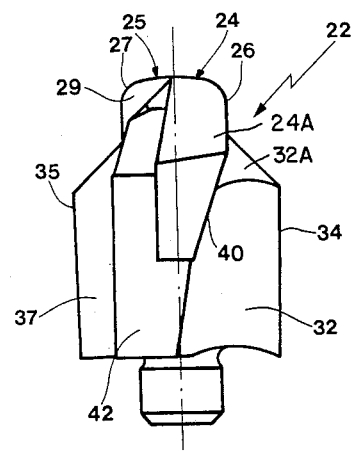
Figure 6:
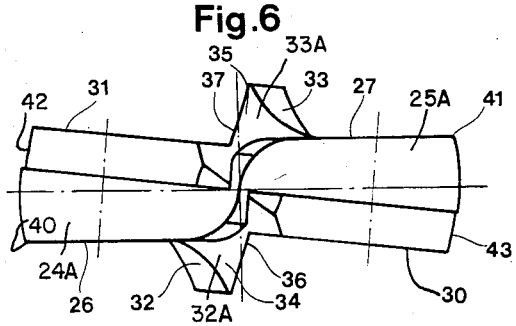

FIGS. 4-6 show a drill tip 22 in magnification. The drill tip 22 comprises a tip body 23 and at least one, in the present case two, cutting inserts 24, 25 brazed thereto. The cutting inserts consist of a hard metal, such as a cemented carbide. The inserts have front end surfaces 24A, 25A which carry ground-in cutting 26, 27 which meet in the centre of the drill tip 22. The cutting edges 26, 27 form an S-shaped contour. The inserts have ground-in positive chip surfaces 28, 29. The radius of curvature of the cutting edges 26, 27 is smaller in the vicinity of the centre of the drill tip than radially away from the same. The shapes of the cutting edges and the chip surfaces are more closely described in U.S. Pat. No. 4,222,690 which is hereby incorporated with the description. The major sides of the tip body 23 each has a planar side surface 30, 31 which is connected to a chip surface 32, 33 via a shoulder 34, 35. The chip surfaces 32, 33 are extensions in the drill tip of the chip gullets 13 shown in FIGS. 1-3. Guide surfaces 32A and 33A are arranged longitudinally forwardly of the chip surfaces 32, 33 and are slanted toward the chip surfaces 32, 33 so as to cooperate with them in guiding chips into the chip gullets. These guide surfaces 32A, 33A define the longitudinally forward end of the chip surfaces 32, 33. The tip body 23 is provided with holes which are to receive a portion of the shank of a fastening screw. Each hole terminates in the chip surface and the opposite side surface. The head of the fastening screw will be received in a countersunk boring in the chip surface when the tip body is secured to the slot of the drill body. Each shoulder 34, for example, projects mainly perpendicular from the side surface 30, and it has a mainly planar support surface 36, 37. The support surfaces 36, 37 are inclined an acute angle β relative to the centerline of the tip body, which is to coincide with the rotational axis CL of the drill. The angle β corresponds to the angle α in FIG. 2 and is thus chosen within the same interval as the angle α. The support surfaces 36, 37 intersect each other if seen in a side view. The contact surfaces 36, 37 terminate longitudinally rearwardly of the front end faces 24A, 25A as depicted in FIG. 4. The lower side 38 of the drill tip 22 is provided with a projecting centering tap 39 whose centerline coincides with the centerline of the drill tip. The centering tap 39 may alternatively be replaced by an axially extending hole. The diameter of the centering tap 39 or the hole is only somewhat lesser than the width of the slot in the drill body. The lower side 38 of the dril tip is provided around the tap 39 or the hole, so that the radially outermost part of the lower side will abut the radially outermost parts of the slot of the drill body in order to ensure a safe location of the drill tip. Each cutting edge 26, 27 is connected to a minor cutting edge 40, 41 which is positioned radially outside the minor sides 42, 43 of the tip body 23. Each minor cutting edge 40, 41 inclines relative to the centerline of the tip body so that they achieve a successive cutting incision during the drilling operation. The upper surfaces of the shoulder are beveled in order to facilitate the chip flow.

Figure 8:
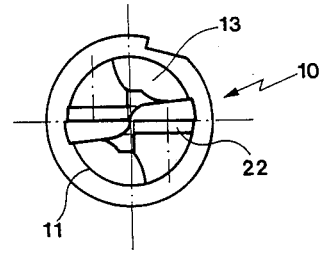
FIGS. 7 and 8 show a drill according to the invention in a side view and a top view, respectively.
Figure 7:
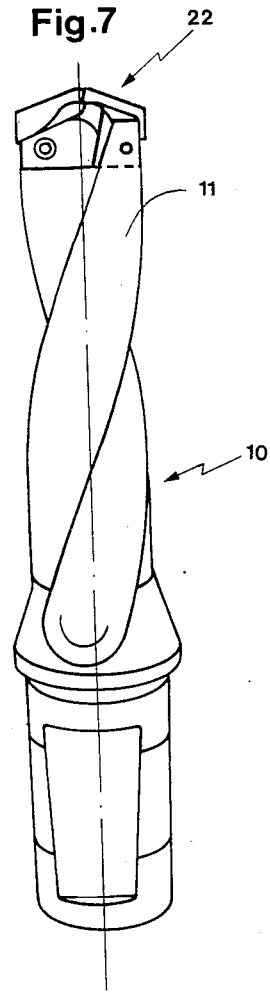

FIGS. 7 and 8 show the assembled drill 10 comprising the drill body 11 and the drill tip 22. The tip body 23 has been downwardly inserted over the slot such that the support surfaces of the tip body engage the support surfaces of the drill body and thus coarsely center the drill tip in the drill body. Then the drill tip is furthermore inserted so that the support surfaces slide against each other. When the lower side of the drill tip engages the bottom of the slot, the centering tap has engaged the hole in the slot and thus finally centered the drill tip in the drill body. The inclination of the contact surfaces between the drill body and the drill tip facilitates the guiding of the drill tip into the slot. When the drill tip has been completely inserted a screw is screwed into each hole in the drill tip and the drill body for fixing of the drill tip in the centered position.

In an alternate embodiment of the invention, not shown, the drill tip and the slot of the drill body have neither a centering tap nor a hole, but the lower sides of them are mainly planar. In this embodiment the inclined contact surfaces serve as the sole centering means which presumes that the support surfaces are made within fine tolerances. Otherwise, the drill is identical with the above-mentioned drill.

Besides a stable and centered attachment of the cutting inserts to the drill body the presently claimed drill results in that a number of drill tips may be used and worn in a sole drill body, and therefore the storage costs for the drill bodies may be kept low.

We claim:

1. A drill comprising a drill body and a drill tip detachably secured thereto,
   said drill body comprising a diametrically extending slot formed in a forward end of said body,
   said slot having a first bottom wall, and
   a pair of front-to-rear extending planar first contact surfaces inclined at a first acute angle relative to a longitudinal axis of said drill body,
   said first contact surfaces intersecting at a location longitudinally rearwardly of a longitudinally forwardmost end of said drill body as said drill body is viewed in a radial direction,
   said drill body including curved chip gullets extending to said slot,
   said drill tip being detachably secured in said slot and including forwardly facing end surfaces carrying cutting edge means, and
   curved chip surfaces arranged longitudinally rearwardly of said cutting edge means and in alignment with the curved chip gullets of said drill body, said curved chip surfaces defining an extension of the chip gullets,
   said drill tip further including a pair of planar second contact surfaces inclined relative to said longitudinal axis at a second acute angle substantially equal to said first angle and situated to engage said first contact surfaces and be wedgingly secured thereto when a second bottom wall of said drill tip abuts said first bottom wall of said slot, and
   side surfaces connected to said curved chip surfaces by outwardly projecting shoulders containing said second contact surfaces,
   said second contact surfaces terminating longitudinally rearwardly of said front end surfaces,
   one of said first and second bottom walls carrying a cylindrical tap and the other of said first and second bottom walls carrying a cylindrical hole receiving said tap.

2. A drill according to claim 1 including screws for securing said drill tip to said drill body, said screws extending generally perpendicularly relative to the radial direction.

3. A drill according to claim 1 wherein said end surface means comprise two end surfaces each carrying a cutting edge, said cutting edges each having a smaller radius of curvature adjacent said longitudinal axis than at a location spaced radially outwardly thereof.

4. A drill according to claim 1, wherein said drill body includes a pair of longitudinal flush channels spaced from opposite sides of said slot.

5. A drill comprising a drill body and a drill tip detachably secured thereto,
   said drill body comprising a diametrically extending slot formed in a forward end of said body,
   said slot having a first bottom wall, and
   a pair of front-to-rear extending planar first contact surfaces inclined at a first acute angle relative to a longitudinal axis of said drill body,
   said drill body including curved chip gullets extending to said slot,
   said drill tip being detachably secured in said slot and including forwardly facing end surface means carrying cutting edge means,
   curved chip surfaces arranged longitudinally rearwardly of said cutting edge means and in alignment with the curved chip gullets of said drill body, said curved chip surfaces defining an extension of the chip gullets,
   said drill tip further including a pair of planar second contact surfaces inclined relative to said longitudinal axis at a second acute angle substantially equal to said first angle and situated to engage said first contact surfaces and be wedgingly secured thereto when a second bottom wall of said drill tip abuts said first bottom wall of said slot,
   side surfaces connected to said curved chip surfaces by outwardly projecting shoulders containing said second contact surfaces, said second contact surfaces terminating longitudinally rearwardly of said front end surfaces,
   guide surfaces arranged longitudinally forwardly of said curved chip surfaces and said outwardly projecting shoulders, said guide surfaces defining the longitudinally forward end of said curved chip surfaces and are slanted toward said curved chip surfaces so as to cooperate with the curved chip surfaces in guiding chips into the chip gullets, and
   one of said first and second bottom walls carrying a cylindrical tap and the other of said first and second bottom walls carrying a cylindrical hole receiving said tap.

6. A drill according to claim 5, wherein said end surface means comprise two end surfaces each carrying a cutting edge, said cutting edges each having a smaller radius of curvature adjacent said longitudinal axis than at a location spaced radially outwardly thereof.

7. A drill according to claim 5, wherein said drill body includes a pair of longitudinal flush channels spaced fom opposite sides of said slot.

* * * * *